United States Patent
Zhang et al.

(10) Patent No.: US 12,412,339 B2
(45) Date of Patent: Sep. 9, 2025

(54) METHOD AND DEVICE FOR RECONSTRUCTING THREE-DIMENSIONAL FACES AND STORAGE MEDIUM

(71) Applicant: BIGO TECHNOLOGY PTE. LTD., Singapore (SG)

(72) Inventors: Xiaowei Zhang, Guangzhou (CN); Zhongyuan Hu, Guangzhou (CN); Gengdai Liu, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 274 days.

(21) Appl. No.: 18/258,493

(22) PCT Filed: Dec. 28, 2021

(86) PCT No.: PCT/CN2021/142012
§ 371 (c)(1),
(2) Date: Jun. 20, 2023

(87) PCT Pub. No.: WO2022/143645
PCT Pub. Date: Jul. 7, 2022

(65) Prior Publication Data
US 2024/0037852 A1    Feb. 1, 2024

(30) Foreign Application Priority Data
Dec. 28, 2020    (CN) .......................... 202011583279.2

(51) Int. Cl.
*G06T 17/20*    (2006.01)

(52) U.S. Cl.
CPC .................... *G06T 17/20* (2013.01)

(58) Field of Classification Search
None
See application file for complete search history.

(56) References Cited

U.S. PATENT DOCUMENTS

| 10,650,564 B1 | 5/2020 | Lin et al. |
| 2004/0051783 A1 | 3/2004 | Chellappa et al. |

(Continued)

FOREIGN PATENT DOCUMENTS

| CN | 109325437 A | 2/2019 |
| CN | 106652025 B | 10/2019 |

(Continued)

OTHER PUBLICATIONS

International Search Report of the International Searching Authority for State Intellectual Property Office of the People's Republic of China in PCT application No. PCT/CN2021/142012 issued on Feb. 24, 2022, which is an international application to which this application claims priority.

(Continued)

*Primary Examiner* — Sultana M Zalalee
(74) *Attorney, Agent, or Firm* — Kolitch Romano Dascenzo Gates LLC

(57) ABSTRACT

A method for reconstructing three-dimensional faces is provided. The method includes: estimating a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model; and reconstructing a three-dimensional face corresponding to the current video frame by inputting the steady-state reconstruction parameter and the dynamic reconstruction parameter into a pre-constructed three-dimensional deformation model.

20 Claims, 6 Drawing Sheets

Estimating a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model — S110

Reconstructing a three-dimensional face corresponding to the current video frame by inputting the steady-state reconstruction parameter and the dynamic reconstruction parameter into a pre-constructed three-dimensional deformation model — S120

(56) References Cited

U.S. PATENT DOCUMENTS

| | | | | |
|---|---|---|---|---|
| 2004/0095344 | A1* | 5/2004 | Dojyun | G06T 13/40 345/419 |
| 2006/0291739 | A1 | 12/2006 | Li et al. | |
| 2019/0384964 | A1 | 12/2019 | Ando | |
| 2021/0191506 | A1* | 6/2021 | Wang | G06F 3/017 |
| 2021/0256752 | A1* | 8/2021 | Chen | G06V 40/175 |
| 2021/0286977 | A1* | 9/2021 | Chen | G06T 17/00 |
| 2021/0407216 | A1* | 12/2021 | Peng | G06V 40/171 |
| 2022/0020195 | A1* | 1/2022 | Kuta | G06V 40/168 |
| 2022/0138454 | A1* | 5/2022 | Zhao | G06F 18/214 382/156 |
| 2022/0269879 | A1* | 8/2022 | Liu | G06V 10/82 |
| 2022/0398795 | A1* | 12/2022 | Phan | G06V 40/174 |
| 2024/0029345 | A1* | 1/2024 | Selvert | G06T 7/40 |

FOREIGN PATENT DOCUMENTS

| | | |
|---|---|---|
| CN | 110619676 A | 12/2019 |
| CN | 110956691 A | 4/2020 |
| CN | 111160124 A | 5/2020 |
| CN | 111259738 A | 6/2020 |
| CN | 111508064 A | 8/2020 |
| CN | 111652049 A | 9/2020 |
| CN | 111951384 A | 11/2020 |
| CN | 112633191 A | 4/2021 |
| GB | 201902067 | 4/2019 |
| JP | 2018136632 A | 8/2018 |
| JP | 2020177620 A | 10/2020 |
| WO | 2020037863 A1 | 2/2020 |
| WO | 2022095721 A1 | 5/2022 |

OTHER PUBLICATIONS

China National Intellectual Property Administration, First office action of Chinese application No. 202011583279.2 issued on Mar. 18, 2024, which is foreign counterpart application of this US application.

Notice of Reasons for Refusal of Japanese application No. 2023-539346 issued on Apr. 22, 2024.

Extended European Search Report Communication Pursuant to Rule 62 EPC for European Application No. 21914379.9 dated Jun. 14, 2024, which is a foreign counterpart application to this application.

Abbasi, Sajjad et al., "Modeling Teacher-Student Techniques in Deep Neural Networks for Knowledge Distillation", 2020 International Conference on Machine Vision and Image Processing (MVIP), IEEE, pp. 1-6, DOI: 10.1109/MVIP49855.2020.9116923 [retrieved on Jun. 12, 2020], Feb. 18, 2020.

Dai, Weidong et al., "Cross-Modal Guidance Network For Sketch-Based 3d Shape Retrieval", 2020 IEEE International Conference on Multimedia and Expo (ICME), IEEE, pp. 1-6, DOI:10.1109/ICME46284.2020.9102925 [retrieved on May 27, 2020], Jul. 6, 2020.

Genova, Kyle et al., "Unsupervised training for 3d morphable model regression", 2018 IEEE/CVF Conference on Computer Vision and Pattern Recognition, pp. 8377-8386, Jun. 18, 2018.

Guler, Riza Alp et al., "DensePose: Dense Human Pose Estimation in the wild", 2018 IEEE/ CVF Conference on Computer Vision and Pattern Recognition, IEEE, pp. 7297-7306, DOI:10.1109/CVPR.2018.00762 [retrieved on Dec. 14, 2018], Jun. 18, 2018.

Honda, So et al., "The proposal of the reverse rendering technique of the face image in consideration of a shielding [ besides*] shadow", IEICE Technical Report, Japan, vol. 120 No. 379, p. 71-p. 75, Feb. 15, 2021.

Jiang, Lei et al., "Pose-invariant three-dimensional face reconstruction", Journal of Electronic Imaging, vol. 28, Issue 5, 053003 (Sep. 2019). https://doi.org/10.1117/1.JEI.28.5.053003, Sep. 30, 2019.

Knowledge distillation—Wikipedia, Retrievea from the Internet : URL:https://en.wikipedia.org/w/index.php?title=Knowledge_distillation&01did=994487781 [retrieved on May 14, 2024], Dec. 15, 2020.

* cited by examiner

Estimating a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model  ~ S110

Reconstructing a three-dimensional face corresponding to the current video frame by inputting the steady-state reconstruction parameter and the dynamic reconstruction parameter into a pre-constructed three-dimensional deformation model  ~ S120

FIG. 1A

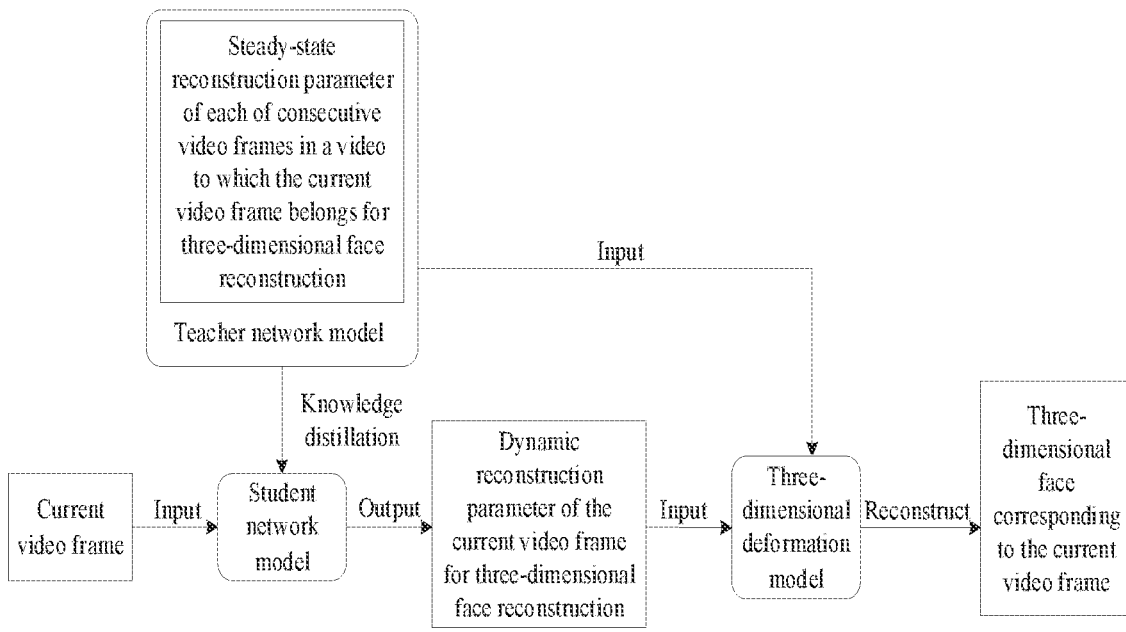

FIG. 1B

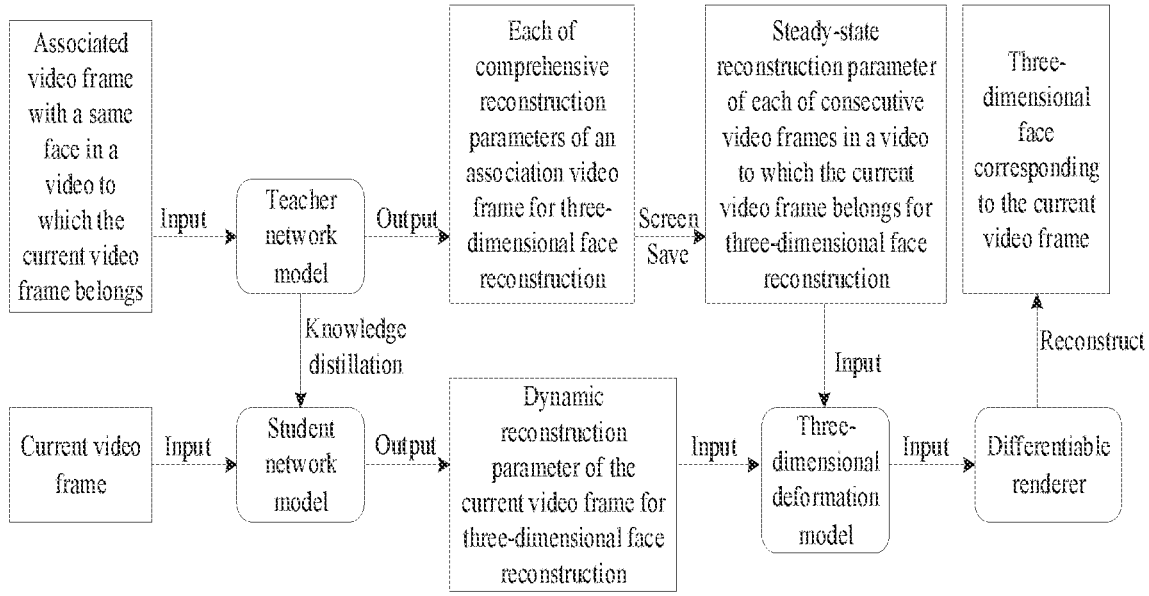

FIG. 2B

Estimating a first comprehensive reconstruction parameter of a first video frame for the three-dimensional face reconstruction and a second comprehensive reconstruction parameter of a second video frame for the three-dimensional face reconstruction by inputting the first video frame and the second video frame into the teacher network model, the first video frame and the second video frame being from a video frame training pair with a same face in a video training set — S310

Estimating a target dynamic reconstruction parameter of the second video frame for the three-dimensional face reconstruction by inputting the second video frame from the video frame training pair into the student network model, and reconstructing a three-dimensional face corresponding to the second video frame by inputting a target steady-state reconstruction parameter in the first comprehensive reconstruction parameter and the target dynamic reconstruction parameter into the three-dimensional deformation model — S320

Calculating a first loss function between the second comprehensive reconstruction parameter and the target dynamic reconstruction parameter and a second loss function between the three-dimensional face corresponding to the second video frame and the second video frame under a predetermined two-dimensional supervision term, and adjusting a weight corresponding to each of loss functions in the first loss function and the second loss function — S330

Generating a corresponding fitting loss function based on each of the loss functions and the corresponding weight, and training the student network model by performing inverse correction on the student network model using the fitting loss function — S340

FIG. 3A

METHOD AND DEVICE FOR RECONSTRUCTING THREE-DIMENSIONAL FACES AND STORAGE MEDIUM

CROSS-REFERENCE TO RELATED APPLICATION

This application is U.S. national stage of international application No. PCT/CN2021/142012, filed on Dec. 28, 2021, which claims priority to Chinese Patent Application No. 202011583279.2, filed on Dec. 28, 2020, entitled "THREE-DIMENSIONAL FACE RECONSTRUCTION METHOD AND DEVICE, EQUIPMENT AND STORAGE MEDIUM", the disclosure of which are herein incorporated by reference in their entireties.

TECHNICAL FIELD

The present disclosure relates to the technical field of image processing, in particular, to a method and a device for reconstructing three-dimensional faces and a storage medium.

BACKGROUND OF THE INVENTION

With the development of video technologies, there is an increasing demand for creating realistic face models in entertainment applications that demand displaying a face image. Such applications include face animation, face recognition, and augmented reality (AR) applications.

SUMMARY OF THE INVENTION

Embodiments of the present disclosure disclose a method and a device for reconstructing three-dimensional faces and a storage medium.

The embodiments of the present disclosure provide a method for reconstructing three-dimensional faces, including:
  estimating a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model; and
  reconstructing a three-dimensional face corresponding to the current video frame by inputting the steady-state reconstruction parameter and the dynamic reconstruction parameter into a pre-constructed three-dimensional deformation model.

The embodiments of the present disclosure provide a computer device for reconstructing three-dimensional faces, including:
  one or more processors; and
  a storage apparatus, configured to store one or more programs; wherein
  the one or more processors, when loading and running the one or more programs, are caused to perform the method for reconstructing three-dimensional faces according to any one of the embodiments of the present disclosure.

The embodiments of the present disclosure provide a non-transitory computer-readable storage medium storing a computer program, wherein the computer program, when loaded and run by a processor, causes the processor to perform the method for reconstructing three-dimensional faces according to any one of the embodiments of the present disclosure.

BRIEF DESCRIPTION OF DRAWINGS

Other features, objects, and advantages of embodiments of the present disclosure will become more apparent through the description of non-limiting embodiments with reference to the following drawings.

FIG. 1A is a flowchart of a method for reconstructing three-dimensional faces according to the embodiments of the present disclosure;

FIG. 1B is a schematic diagram of a process of three-dimensional face reconstruction according to the embodiments of the present disclosure;

FIG. 2B is a schematic diagram of a process of three-dimensional face reconstruction according to the embodiments of the present disclosure;

FIG. 3A is a flowchart of a training method of a student network model during three-dimensional face reconstruction according to the embodiments of the present disclosure;

DETAILED DESCRIPTION

Figure 1C:
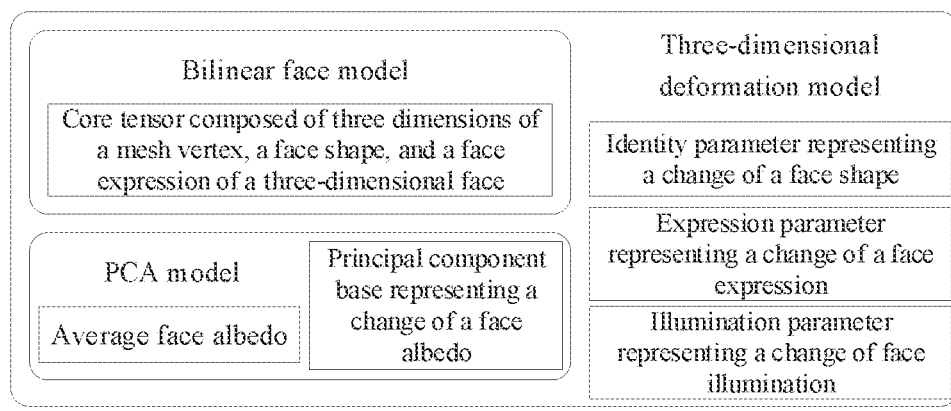
FIG. 1C is a schematic structural diagram of a three-dimensional deformation model for three-dimensional face reconstruction in a method according to the embodiments of the present disclosure.

The present disclosure is described hereinafter with reference to the accompanying drawings and embodiments. It should be understood that the specific embodiments described herein are merely for the purpose of explaining the present disclosure but not limiting the present disclosure. In addition, it should be further noted that, for the convenience of description, only some of the structures associated with the present disclosure are shown in the drawings, not all of them. In addition, in the case of no conflict, the embodiments and features in the embodiments in the present disclosure may be combined.

For three-dimensional face reconstruction, because there usually are various expressions existing in different video frames of a video recorded on a same face, a face expression in each of the video frames needs to be tracked during three-dimensional face reconstruction, to ensure that the reconstructed three-dimensional face can be configured with a corresponding expression, thereby enhancing the reality of the three-dimensional face reconstruction.

For the three-dimensional face reconstruction of each of the video frames in a video recorded by a user, each of the video frames is usually taken as an independent face image, a pre-constructed neural network model is adopted to predict a reconstruction parameter of each of the video frames which needs to be referred for reconstructing the three-dimensional faces, and then the reconstruction parameter is adopted to perform the three-dimensional face reconstruction for each of the video frames. In this case, due to the continuity between the video frames, in the case that the reconstruction parameters predicted under adjacent video frames are unstable, the reconstructed three-dimensional face shakes. Further, because the reconstruction parameter prediction under each of the video frames is performed for the same face, in the case that the reconstruction parameter for each of the video frames is predicted, unnecessary prediction calculation amount is increased, which affects the efficiency of the three-dimensional face reconstruction. The embodiments of the present disclosure are provided to solve the above discussed issues.

Embodiment I

FIG. 1A is a flowchart of a method for reconstructing three-dimensional faces according to the embodiments of the present disclosure, and the present embodiment is applicable to performing the three-dimensional face reconstruction on multiple video frames with a same face. The method for reconstructing three-dimensional faces according to the present embodiment is performed by an apparatus for reconstructing three-dimensional faces according to the embodiments of the present disclosure, which is achieved by software and/or hardware and integrated into a computer device for performing the method.

In some embodiments, referring to FIG. 1A, the method includes the following processes.

In S110, a dynamic reconstruction parameter of a current video frame for three-dimensional face reconstruction is estimated by inputting, in response to a steady-state reconstruction parameter of the current video frame for the three-dimensional face reconstruction having been estimated by a pre-constructed teacher network model, the current video frame into a student network model distilled from the teacher network model.

In some embodiments, in entertainment applications that have a demand for displaying a face image, such as face animation, face recognition, and augmented reality applications, the three-dimensional face reconstruction is performed on a video frame including a face image in a video recorded by some users, so as to achieve an entertainment interactive function under a specific face effect. In this case, the three-dimensional face reconstruction is achieved by controlling, based on at least one reconstruction parameter, a corresponding deformation of a standard face shape and a change of a face expression to generate a corresponding three-dimensional face, and improving the display of details, such as illumination conditions and posture angles, in the three-dimensional face. Therefore, it can be seen that accuracy of the reconstruction parameters estimated for each of the video frames to be reconstructed directly affects the reality of the reconstructed three-dimensional face corresponding to the video frame. Therefore, to improve the reality of the reconstructed three-dimensional face, it is required to accurately estimate each of the reconstruction parameters specified by the three-dimensional face reconstruction from the video frame to be reconstructed. In some embodiments, the reconstruction parameters in the present embodiment include a deformation parameter representing a change of a face shape, an expression parameter representing a change of a face expression, an albedo parameter representing a change of a face albedo, an illumination parameter representing a change of face illumination, a position parameter representing a face translation, a rotation parameter representing a head posture, and the like, wherein the albedo parameter includes RGB color information of a two-dimensional face image to be reconstructed.

To reconstruct the three-dimensional face for each of the video frames in a video recorded by a user, a corresponding neural network model is generally trained in advance to accurately estimate each of the reconstruction parameters, to be referred to under the three-dimensional face reconstruction, of each of the video frames to be reconstructed, and then each of the estimated reconstruction parameters is adopted to perform the three-dimensional face reconstruction on the corresponding video frame. However, because consecutive video frames of the video recorded by the user usually include a same face, that is, only face expressions in the consecutive video frames need to be tracked, in this case, adopting the pre-trained neural network model to estimate each of the reconstruction parameters of each of the video frames for the three-dimensional face reconstruction, causes a problem that the three-dimensional faces reconstructed for the consecutive video frames shakes. Moreover, in the case that the neural network model respectively estimates each of the reconstruction parameters of each of the video frames, a large amount of computational overhead also exists due to the model estimation. In view of this, in the embodiments, it is considered that the consecutive video frames usually have the same face, indicating that reconstruction parameters representing the changes of the face identity and the texture referenced by the three-dimensional face reconstruction of the consecutive video frames almost do not change, and only reconstruction parameters representing the changes of the face expression and the illumination change. Therefore, in the embodiments, the reconstruction parameter of each of the video frames for the three-dimensional face reconstruction is divided into steady-state reconstruction parameters (such as reconstruction parameters representing changes in the face identity and the albedo) that almost do not change under the same face and dynamic reconstruction parameters (such as reconstruction parameters representing changes of the face expression and the illumination) that are unique for each of the video frames.

The variation of the dynamic reconstruction parameters among multiple video frames of the same face is higher than the variation of the steady-state reconstruction parameters among the multiple video frames of the same face.

In this case, for the consecutive video frames in the video recorded by the user, the pre-trained neural network model capable of accurately estimating each of the reconstruction parameters of each of the video frames for the three-dimensional face reconstruction is used as a pre-constructed teacher network model in the present embodiment, each of the reconstruction parameters, for the three-dimensional face reconstruction, of a first video frame or first several video frames in the consecutive video frames is estimated by the teacher network model, and the reconstruction parameters hardly changed for the same face in the estimated reconstruction parameters are stored as the steady-state reconstruction parameters, for the three-dimensional face reconstruction, of subsequent video frames in the consecutive video frames. In this way, to reconstruct the three-dimensional face of the subsequent video frames, there is no need to estimate the corresponding steady-state reconstruction parameters, but only need to estimate the dynamic reconstruction parameters for the three-dimensional face reconstruction, which greatly reduces parameter estimation amount during the three-dimensional face reconstruction, thereby improving the efficiency of the three-dimensional face reconstruction.

In some embodiments, considering that the pre-constructed teacher network model is capable of accurately estimating each of the reconstruction parameters of each of the video frames for the three-dimensional face reconstruction, as shown in FIG. 1B, to ensure estimation accuracy of the dynamic reconstruction parameter of each of the video frames for the three-dimensional face reconstruction, knowledge distillation is adopted to analyze an essence of an estimation function for the dynamic reconstruction parameter in the teacher network model, so as to correspondingly migrate the function of accurately estimating the dynamic reconstruction parameter of each of the video frames in the teacher network model into the student network model. Therefore, the student network model is capable of accurately estimating the dynamic reconstruction parameter of each of the video frames for the three-dimensional face reconstruction but does not estimate the steady-state reconstruction parameter of the video frame for the three-dimensional face reconstruction, thereby reducing the parameter estimation amount for the three-dimensional face reconstruction.

In some embodiments, to reconstruct the three-dimensional face for each of the video frames in the video recorded by a user, it is first determined whether the steady-state reconstruction parameter of a current video frame for the three-dimensional face reconstruction has been estimated by the teacher network model in advance. In the case that the steady-state reconstruction parameter of the current video frame for the three-dimensional face reconstruction has been estimated by the teacher network model, the current video frame is directly inputted into the student network model which is acquired by performing the knowledge distillation on the teacher network model. The dynamic reconstruction parameter of the current video frame for the three-dimensional face reconstruction is accurately estimated by the student network model. In this way, each of the reconstruction parameters of the current video frame for the three-dimensional face reconstruction is acquired, and then, the three-dimensional face is reconstructed for the current video frame based on each of the acquired reconstruction parameters.

In S120, a three-dimensional face corresponding to the current video frame is reconstructed by inputting the steady-state reconstruction parameter and the dynamic reconstruction parameter into a pre-constructed three-dimensional deformation model.

In some embodiments, upon the dynamic reconstruction parameter of the current video frame for the three-dimensional face reconstruction being estimated by the student network model, both the steady-state reconstruction parameter estimated by the teacher network model and the dynamic reconstruction parameter of the current video frame for the three-dimensional face reconstruction are inputted into the pre-constructed three-dimensional deformation model. The three-dimensional deformation model is used to model the shape and appearance of the three-dimensional face in the current video frame based on the steady-state reconstruction parameter and the dynamic reconstruction parameter, and upon the modeling, corresponding face expression, illumination information, and the like are correspondingly adjusted. In this way, the three-dimensional face corresponding to the current video frame is reconstructed.

In some embodiments, the three-dimensional deformation model in the present embodiment is composed of a bilinear face model and a principal component analysis (PCA) model. As shown in FIG. 1C, the bilinear face model is mainly configured for modeling the changes of the face shape and expression during the three-dimensional face reconstruction, and the PCA model is mainly configured for modeling the change of the face albedo during the three-dimensional face reconstruction.

Figure 1D:
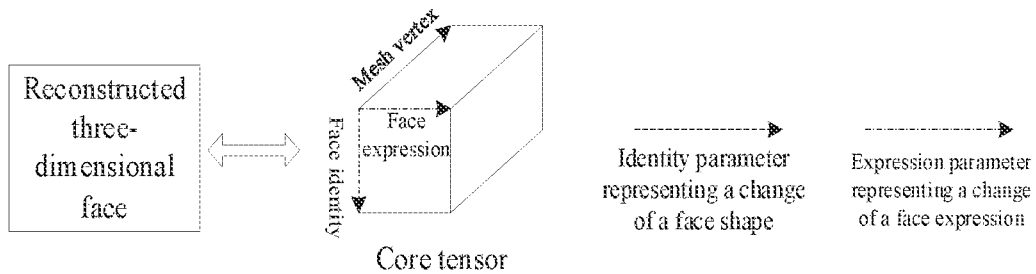
FIG. 1D is a schematic structural diagram of a bilinear face model in a three-dimensional deformation model in a method according to the embodiments of the present disclosure.

The bilinear face model defines a core tensor of the three-dimensional face, wherein the core tensor is composed of three dimensions, namely a mesh vertex, a face shape (the face shape corresponding to the face identity), and a face expression of the three-dimensional face. In this case, as shown in FIG. 1D, the bilinear face model is expressed as: $S=C_r \times_2 \alpha \times_3 \delta$, wherein $C_r$ is the core tensor of the three-dimensional face, and the three dimensions under the core tensor are a mesh vertex, a face identity, and a face expression of the three-dimensional face in sequence. In some embodiments, it is assumed that 20084 mesh vertices are adopted to represent a geometric shape of the three-dimensional face: $S=[x_1,y_1,z_1,L,x_{20084},y_{20084},z_{20084}] \in R^{60252}$, it is set that a core tensor $C_r \in R^{60252 \times 79 \times 46}$ includes 79 identity parameters representing the change of the face shape and 46 expression parameters representing the change of the face expression, $\alpha \in R^{79}$ is a 79-dimensional identity parameter representing the change of the face shape, and $\delta \in R^{46}$ is a 46-dimensional expression parameter representing the change of the face expression.

In some embodiments, for accurately constructing the core tensor defined in the bilinear face model, three-dimensional face scanning data is collected from a multi-dimensional data source, and a corresponding core tensor is acquired by performing high-order singular value decomposition, under a face shape dimension and a face expression dimension, on a three-dimensional face reconstructed based on the three-dimensional face scanning data.

In some embodiments, face data of a large number of individuals of different ethnic groups, different ages, and different genders is captured by a depth camera in advance, wherein a piece of non-expressive face data and multiple pieces of face data with different expressions are captured for each of the individuals. The face data is determined as the three-dimensional face scanning data in the embodiments, and for each piece of three-dimensional face scanning data, a standard face network including 20084 mesh vertices is adopted to perform corresponding deformation, to ensure that the deformed face network is as close as possible to the three-dimensional face scanning data, and each of face feature points in the deformed face network corresponds to a face feature point in the three-dimensional face scanning data one by one, such that a face mesh model (Blendshape model) including 46 face expression actions is constructed for each of individuals. In this case, assuming that three-dimensional face scanning data of N individuals is captured, a face mesh model including N individuals, each individual having 46 different face expression actions, is acquired, each of the face mesh models contains a face database of 20084 mesh vertices, and a three-dimensional tensor of 60252×N× 46 is acquired by integrating the face database. In this case, a corresponding core tensor $C_r \in R^{60252 \times 79 \times 46}$ is acquired by performing, under an individual dimension (N) and a face expression dimension (46), a high-order singular value decomposition on the three-dimensional tensor.

At the same time, the PCA model in the embodiments defines an average face albedo and a principal component base representing the change of the face albedo, which is expressed as $T=\overline{T}+T_{base}\beta$, wherein $\overline{T}\in R^{60252}$ is the average face albedo defined in the PCA model, $T_{base}\in R^{60252\times 79}$ base is a 79-dimensional principal component base representing the change of the face albedo in the PCA model, and $\beta\in R^{79}$ is an albedo parameter of a change of the principal component base. In this case, the albedo parameter includes RGB color information of each of the mesh vertices in a face image, so as to achieve color reconstruction during the three-dimensional face reconstruction.

In addition, to ensure three-dimensional detail features during the three-dimensional face reconstruction, the three-dimensional deformation model of the embodiments further defines an illumination parameter $\gamma\in R^{27}$ representing a change of face illumination, a position parameter $t\in R^3$ representing a face translation, and a rotation parameter $p\in R^3$ representing a head posture. The present embodiments approximate illumination in a three-dimensional scene using spherical harmonic illumination to estimate a corresponding illumination parameter $\gamma$.

Therefore, for accurately reconstructing the three-dimensional face, in the embodiments, the reconstruction parameters specified by the three-dimensional face reconstruction are $(\alpha, \delta, \beta, \gamma, t, p)\in R^{237}$, wherein the steady-state reconstruction parameter includes an identity parameter $\alpha\in R^{79}$ representing the change of the face shape, and an albedo parameter $\beta\in R^{79}$ representing the change of the face albedo, and the remaining $(\delta, \gamma, t, p)\in R^{79}$ are dynamic reconstruction parameters of each of the video frames for the three-dimensional face reconstruction.

The number of the reconstruction parameters described in the embodiments is only an example, which may be specifically set according to corresponding reconstruction requirements and is not limited in the embodiments.

In some embodiments, a reconstruction process of the three-dimensional face using the three-dimensional deformation model composed of the bilinear face model and the PCA model includes: acquiring a corresponding three-dimensional deformation face by adjusting the core tensor by inputting a reconstruction parameter representing a change of the face shape in the steady-state reconstruction parameters and a reconstruction parameter representing a change of the face expression in the dynamic reconstruction parameters into the bilinear face model; and acquiring a reconstructed three-dimensional face by correcting an albedo of the three-dimensional deformation face based on the average face albedo by inputting the three-dimensional deformation face and a reconstruction parameter matched with the principal component base under the PCA model in the steady-state reconstruction parameters and the dynamic reconstruction parameters into the PCA model.

In some embodiments, upon the steady-state reconstruction parameter and the dynamic reconstruction parameter of the current video frame for the three-dimensional face reconstruction being estimated, both the steady-state reconstruction parameter and the dynamic reconstruction parameter are inputted into the three-dimensional face deformation model to deform the three-dimensional standard face and adjust the expression of the three-dimensional standard face. In this case, the three-dimensional deformation model is composed of the bilinear face model and the PCA model, wherein different models have different reconstruction functions. The bilinear face model is mainly configured for modeling the changes in the face shape and expression during the three-dimensional face reconstruction, and the PCA model is mainly configured for modeling the change of the face albedo during the three-dimensional face reconstruction. Therefore, the three-dimensional face reconstruction is performed on the current video frame by the bilinear face model and the PCA model in sequence.

In some embodiments, firstly, the identity parameter, defined in the bilinear face model, representing the change of the face shape is screened out from the steady-state reconstruction parameters estimated for the current video frame, and the expression parameter, defined in the bilinear face model, representing the change of the face expression is screened out from the dynamic reconstruction parameters estimated for the current video frame. Then the screened identity parameter and expression parameter are inputted into the bilinear face model, and the core tensor defined in the bilinear face model is correspondingly changed in shape and expression through a model representation function of the above bilinear face model, thereby acquiring a corresponding three-dimensional deformation face. Finally, the reconstruction parameter matched the principal component base under the PCA model is screened out from the steady-state reconstruction parameters and the dynamic reconstruction parameters estimated for the current video frame, both the three-dimensional deformation face and the screened reconstruction parameter are inputted into the PCA model, and the albedo correction is performed, based on the average face albedo, on the three-dimensional deformation face using the model representation function of the above PCA model, thereby acquiring the reconstructed three-dimensional face.

In the embodiments, considering that the consecutive video frames in the same video include the same face, the steady-state reconstruction parameter of each of the video frames that hardly changes under the three-dimensional face reconstruction is estimated uniformly in advance by the pre-constructed teacher network model, and subsequently, to reconstruct the three-dimensional face for each of the current video frames, the dynamic reconstruction parameter of the current video frame for the three-dimensional face reconstruction is directly estimated by the student network model distilled from the teacher network model. Because the student network model is acquired by performing knowledge distillation on the teacher network model, and the steady-state reconstruction parameter of each of the video frames for the three-dimensional face reconstruction does not need to be respectively calculated, the computational overhead of the three-dimensional face reconstruction is greatly reduced, the efficiency of the three-dimensional face reconstruction is improved, and the accuracy of the dynamic reconstruction parameter of the current video frame for the three-dimensional face reconstruction is ensured. Then, the steady-state reconstruction parameter and the dynamic reconstruction parameter of the current video frame for the three-dimensional face reconstruction are directly inputted into the pre-constructed three-dimensional deformation model to reconstruct the three-dimensional face corresponding to the current video frame. Because the steady-state reconstruction parameters of the consecutive video frames for the three-dimensional face reconstruction are unchanged, a shaking problem of the consecutive video frames under the three-dimensional face reconstruction is avoided. At the same time, on the premise of ensuring the stability of the three-dimensional face reconstruction of the consecutive video frames, the dynamic reconstruction parameter of each of the video frames for the three-dimensional face reconstruction is used to achieve the individualized reconstruction of the three-dimensional face of each of the video frames, such that the accuracy of the three-dimensional face reconstruction is improved.

Embodiment II

Figure 2A:
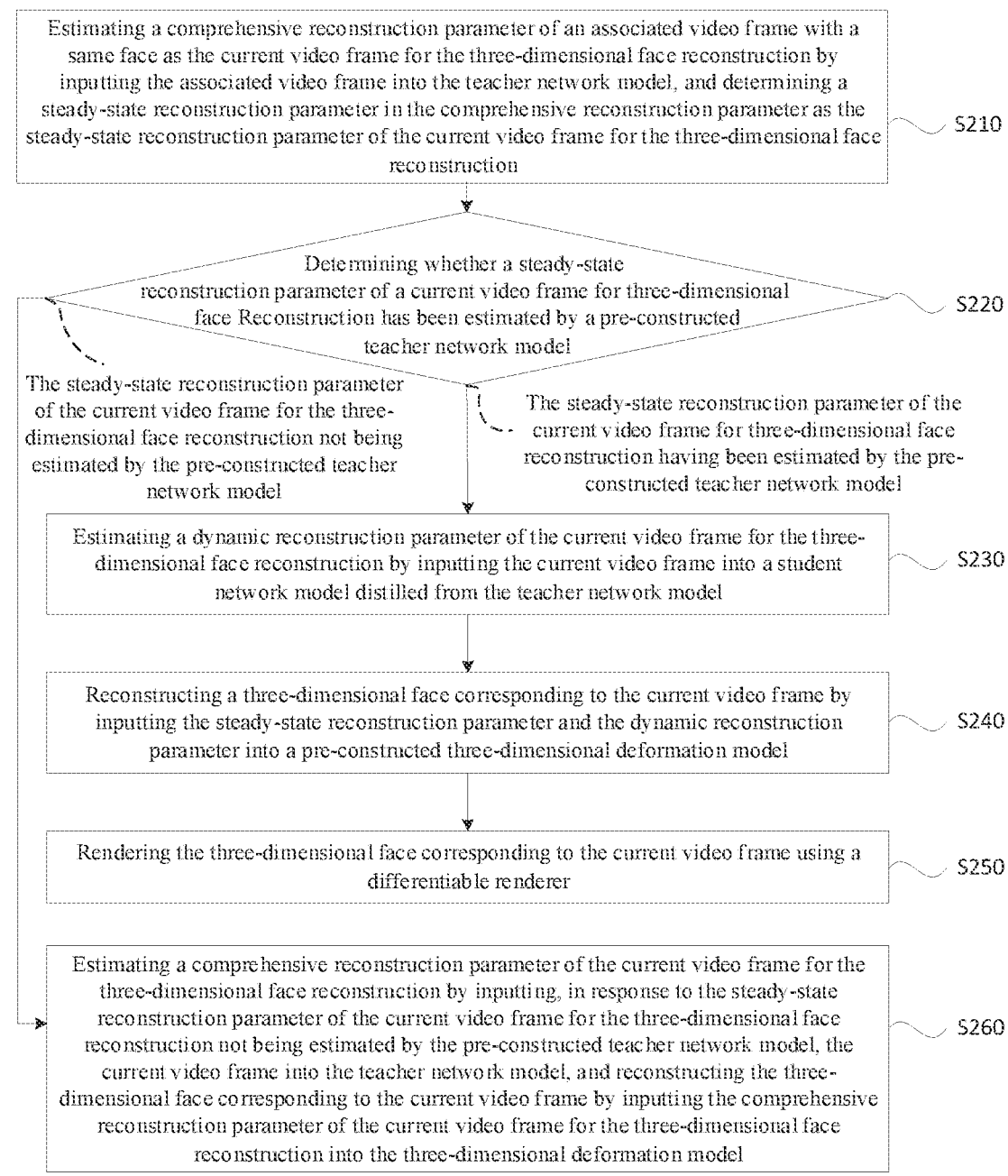
FIG. 2A is a flowchart of a method for reconstructing three-dimensional faces according to the embodiments of the present disclosure.

FIG. 2A is a flowchart of a method for reconstructing three-dimensional faces according to the embodiments of the present disclosure; and FIG. 2B is a schematic diagram of a process of three-dimensional face reconstruction according to the embodiments of the present disclosure. The present embodiment is optimized based on the above embodiments. As shown in FIG. 2A, the present embodiment mainly explains and illustrates a process of estimating the steady-state reconstruction parameter of the current video frame for the three-dimensional face reconstruction.

As shown in FIG. 2A, the present embodiment includes the following processes.

In S210, a comprehensive reconstruction parameter of an associated video frame with a same face as the current video frame for the three-dimensional face reconstruction is estimated by inputting the associated video frame into the teacher network model, and the steady-state reconstruction parameter in the comprehensive reconstruction parameter is determined as the steady-state reconstruction parameter of the current video frame for the three-dimensional face reconstruction.

In some embodiments, to estimate the steady-state reconstruction parameter of the current video frame for the three-dimensional face reconstruction in advance, prior to reconstructing the three-dimensional face of the current video frame, the associated video frame with the same face as the current video frame is firstly determined. In some embodiments, the associated video frame is the first video frame with a face within the current video frame in a video to which the current video frame belongs, or the associated video frames are the first m video frames with the face within the current video frame in the video to which the current video frame belongs, wherein m represents a target number. That is, the number of the associated video frame is one or more. At this time, the associated video frame in the video to which the current video frame belongs is inputted into the teacher network model, and the comprehensive reconstruction parameter of the associated video frame for the three-dimensional face reconstruction is accurately estimated by the teacher network model. Then, the identity parameter representing the change of the face shape and the albedo parameter representing the change of the face texture in the comprehensive reconstruction parameter that are almost unchanged among the consecutive video frames are determined as the steady-state reconstruction parameters of the current video frame for the three-dimensional face reconstruction in the embodiments.

In some embodiments, m is a positive integer greater than 1.

At this time, for the consecutive video frames with the same face in the video to which the current video frame belongs, the first video frame in the consecutive video frames is determined as the associated video frame, or the first multiple video frames are determined as the associated video frames. For the three-dimensional face reconstruction of the associated video frames, the teacher network model is adopted to estimate each of the corresponding reconstruction parameters, and the corresponding steady-state reconstruction parameter is screened out from the estimated comprehensive reconstruction parameter and subsequently determined as the steady-state reconstruction parameter of each of the video frames behind the associated video frame for the three-dimensional face reconstruction. That is, to reconstruct the three-dimensional face by taking one of the other video frames except for the associated video frames in the video to be reconstructed as the current video frame, the steady-state reconstruction parameters for the three-dimensional face reconstruction estimated by the teacher network model exist. To reconstruct the three-dimensional face by taking one of the associated video frames as the current video frame, there is no steady-state reconstruction parameter estimated by the teacher network model for the three-dimensional face reconstruction, therefore the current video frame needs to be inputted into the teacher network model to estimate each of the reconstruction parameters for the three-dimensional face reconstruction.

In some embodiments, in the case that the associated video frames are the first m video frames with the face within the current video frame in the video to which the current video frame belongs, as shown in FIG. 2B, determining the steady-state reconstruction parameter in the comprehensive reconstruction parameter as the steady-state reconstruction parameter of the current video frame for the three-dimensional face reconstruction includes: acquiring the steady-state reconstruction parameter of the current video frame by fusing the steady-state reconstruction parameters of a same type from the comprehensive reconstruction parameters of the associated video frames. In some embodiments, in the case that there are multiple associated video frames for the current video frame, the comprehensive reconstruction parameter of each of the associated video frames for the three-dimensional face reconstruction is estimated by the teacher network model, a weighted summation is performed on the steady-state reconstruction parameters with the same type from the comprehensive reconstruction parameters of the multiple associated video frames, and then the fused steady-state reconstruction parameter is determined as the steady-state reconstruction parameter of the current video frame, therefore the accuracy of the steady-state reconstruction parameter is ensured, and an error caused by using only one frame to estimate the steady-state reconstruction parameter is avoided.

S220, it is determined whether the steady-state reconstruction parameter of the current video frame for the three-dimensional face reconstruction is estimated by the pre-constructed teacher network model, and S230 is executed in the case that the steady-state reconstruction parameter of the current video frame for the three-dimensional face reconstruction is estimated by the pre-constructed teacher network model, or S260 is executed in the case that the steady-state reconstruction parameter of the current video frame for the three-dimensional face reconstruction is not estimated by the pre-constructed teacher network model.

In S230, the dynamic reconstruction parameter of the current video frame for the three-dimensional face reconstruction is estimated by inputting the current video frame into the student network model distilled from the teacher network model.

In S240, a three-dimensional face corresponding to the current video frame is reconstructed by inputting the steady-state reconstruction parameter and the dynamic reconstruction parameter into the pre-constructed three-dimensional deformation model.

In S250, the three-dimensional face corresponding to the current video frame is rendered using a differentiable renderer.

In the embodiments, a differentiable renderer is adopted for rendering the three-dimensional face, such that a texture and a picture of the rendered three-dimensional face are more similar to the current video frame, and the reality of the three-dimensional face reconstruction is improved.

In S260, the comprehensive reconstruction parameter of the current video frame for the three-dimensional face reconstruction is estimated by inputting, in response to the steady-state reconstruction parameter of the current video frame for the three-dimensional face reconstruction not being estimated by the pre-constructed teacher network model, the current video frame into the teacher network model, and the three-dimensional face corresponding to the current video frame is reconstructed by inputting the comprehensive reconstruction parameter of the current video frame for the three-dimensional face reconstruction into the three-dimensional deformation model.

In the embodiments, in the case that the current video frame is an associated video frame predetermined in the video to which the current video frame belongs, it indicates that the steady-state reconstruction parameter of the current video frame for the three-dimensional face reconstruction is not estimated by the teacher network model, therefore the current video frame is directly inputted into the teacher network model, such that the teacher network model accurately estimates each of the comprehensive reconstruction parameters of the current video frame for the three-dimensional face reconstruction. Then, the comprehensive reconstruction parameter of the current video frame for the three-dimensional face reconstruction is input into the three-dimensional deformation model, such that the three-dimensional deformation model deforms a standard three-dimensional face and adjusts the expression of the standard three-dimensional face and so on based on the comprehensive reconstruction parameter, thereby reconstructing the three-dimensional face corresponding to the current video frame.

In the embodiments, the steady-state reconstruction parameter of each of the video frames that hardly changes under the three-dimensional face reconstruction is estimated uniformly in advance by the pre-constructed teacher network model, and subsequently, to reconstruct the three-dimensional face for each of the current video frames, the dynamic reconstruction parameter of the current video frame for the three-dimensional face reconstruction is directly estimated by the student network model distilled from the teacher network model. Because the student network model is acquired by performing the knowledge distillation on the teacher network model, and the steady-state reconstruction parameter of each of the video frames for the three-dimensional face reconstruction does not need to be respectively calculated, the computational overhead of the three-dimensional face reconstruction is greatly reduced, the efficiency of the three-dimensional face reconstruction is improved, and the accuracy of the dynamic reconstruction parameter of the current video frame for the three-dimensional face reconstruction is ensured. And then, the steady-state reconstruction parameter and the dynamic reconstruction parameter of the current video frame for the three-dimensional face reconstruction are directly inputted into the pre-constructed three-dimensional deformation model to reconstruct the three-dimensional face corresponding to the current video frame. Because the steady-state reconstruction parameters of the consecutive video frames for the three-dimensional face reconstruction are unchanged, the shaking problem of the three-dimensional face reconstruction for the consecutive video frames is avoided. At the same time, on the premise of ensuring the stability of the three-dimensional face reconstruction of the consecutive video frames, the dynamic reconstruction parameter of each of the video frames for the three-dimensional face reconstruction is used to achieve the individualized reconstruction of the three-dimensional face of each of the video frames, such that the accuracy of the three-dimensional face reconstruction is improved.

Embodiment III

Figure 3B:
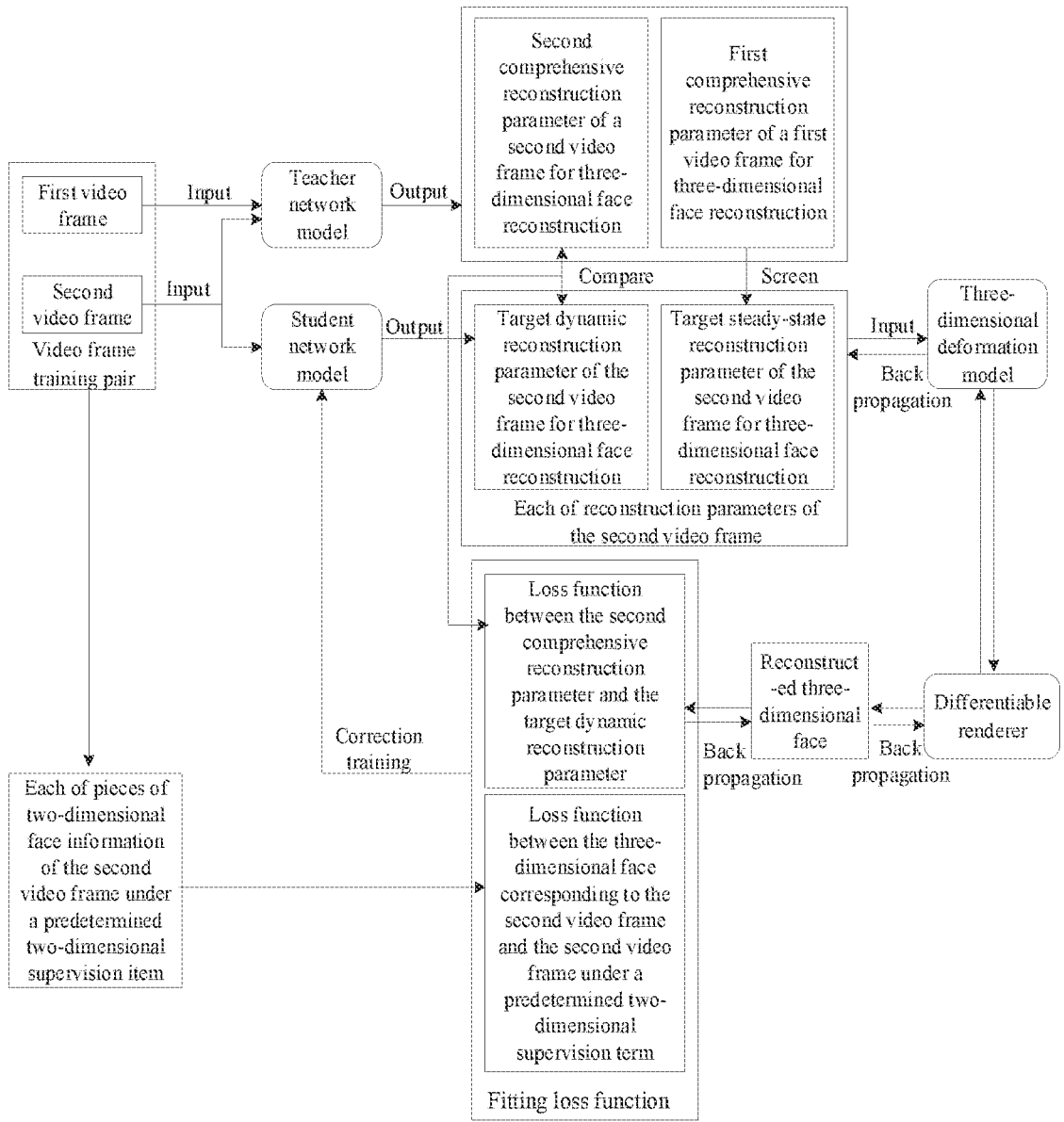
FIG. 3B is a schematic diagram of a training process of a student network model according to the embodiments of the present disclosure.

FIG. 3A is a flowchart of a training method of a student network model during three-dimensional face reconstruction according to the embodiments of the present disclosure; and FIG. 3B is a schematic diagram of a training process of the student network model according to the embodiments of the present disclosure. The present embodiment is optimized based on the above embodiments. As shown in FIG. 3A, the present embodiment mainly explains and illustrates a training process of the student network model by performing knowledge distillation on a teacher network model.

As shown in FIG. 3A, the present embodiment includes the following processes.

In S310, a first comprehensive reconstruction parameter of a first video frame for the three-dimensional face reconstruction and a second comprehensive reconstruction parameter of a second video frame for the three-dimensional face reconstruction are estimated by inputting the first video frame and the second video frame into the teacher network model, wherein the first video frame and the second video frame are from a video frame training pair with a same face in a video training set.

In some embodiments, because the student network model is acquired by performing the knowledge distillation on the pre-trained teacher network model which is capable of accurately estimating each of the reconstruction parameters of each of the video frames for the three-dimensional face reconstruction, when training the student network model, it is still necessary to estimate each of the reconstruction parameters of the video frame with the same face by the teacher network model and taking the estimated reconstruction parameters as a reference to analyze the estimation accuracy of the student network model. Therefore, in a predetermined video training set, a training sample is mainly the video frame training pair with the same face, and in this case, the first video frame in the video frame training pair is used as a source of the steady-state reconstruction parameter estimated for the second video frame by the teacher network model.

In some embodiments, as shown in FIG. 3B, when training the student network model, the first video frame and the second video frame in each of the video frame training pairs are inputted into the teacher network model, and the teacher network model respectively estimates each of the comprehensive reconstruction parameters of the first video frame and the second video frame for the three-dimensional face reconstruction. In this case, the second comprehensive reconstruction parameter of the second video frame for the three-dimensional face reconstruction estimated by the teacher network model is subsequently used to analyze the accuracy of each of the target dynamic reconstruction parameters estimated by the student network model for the second video frame, and the steady-state reconstruction parameter in the first comprehensive reconstruction parameter of the first video frame for the three-dimensional face reconstruction estimated by the teacher network model is subsequently used as a target steady-state reconstruction parameter matching each of the target dynamic reconstruction parameters estimated by the student network model for the second video frame. Therefore, the three-dimensional face reconstruction is performed on the second video frame by adopting each of the target dynamic reconstruction parameters estimated by the student network model for the second video frame and the target steady-state reconstruction parameter.

In S320, a target dynamic reconstruction parameter of the second video frame for the three-dimensional face reconstruction is estimated by inputting a second video frame from the video frame training pair into the student network model, and a three-dimensional face corresponding to the second video frame is reconstructed by inputting a target steady-state reconstruction parameter in the first comprehensive reconstruction parameter and the target dynamic reconstruction parameter into the three-dimensional deformation model.

In some embodiments, the target dynamic reconstruction parameter of the second video frame for the three-dimensional face reconstruction is estimated by the student network model by synchronously inputting the second video frame in each of the video frame training pairs into the student network model. At this time, because the student network model is in a model training process, the steady-state reconstruction parameter estimated by the student network model may be inaccurate. In this case, the corresponding target steady-state reconstruction parameter is screened out from the first comprehensive reconstruction parameter estimated for the first video frame by the teacher network model and is determined as the steady-state reconstruction parameter of the second video frame for the three-dimensional face reconstruction, and then the target steady-state reconstruction parameter and the target dynamic reconstruction parameter estimated by the student network model are inputted into the three-dimensional deformation model, such that the three-dimensional face corresponding to the second video frame is reconstructed by the three-dimensional deformation model by correspondingly deforming the standard three-dimensional face, adjusting the expression and the albedo of the standard three-dimensional face, and correspondingly adjusting corresponding three-dimensional detail display information. Subsequently, by comparing the similarity between the second video frame and the reconstructed three-dimensional face, as well as the similarity between the second comprehensive reconstruction parameter estimated for the second video frame by the teacher network model and the target dynamic reconstruction parameter estimated for the second video frame by the student network model, fidelity of the reconstructed three-dimensional face is analyzed.

In S330, a first loss function between the second comprehensive reconstruction parameter and the target dynamic reconstruction parameter and a second loss function between the three-dimensional face corresponding to the second video frame and the second video frame under a predetermined two-dimensional supervision term are calculated, and a weight corresponding to each of loss functions in the first loss function and the second loss function is adjusted.

In the embodiments, for analyzing the fidelity of the reconstructed three-dimensional face with respect to a face in the second video frame, a corresponding loss function is predetermined in the present embodiment, and the similarity between the reconstructed three-dimensional face and the second video frame is compared based on the loss function. The loss function in the embodiments is divided into two types, namely a loss function (i.e. a first loss function) between the second comprehensive reconstruction parameter and the target dynamic reconstruction parameter, and a loss function (i.e. a second loss function) between the three-dimensional face corresponding to the second video frame and the second video frame under a predetermined two-dimensional supervision term, such that a reconstruction error of the three-dimensional face is avoided as comprehensively as possible.

In some embodiments, the loss function, between the second comprehensive reconstruction parameter and the target dynamic reconstruction parameter, includes regulation terms corresponding to the reconstruction parameters, which is represented as:

$$L_{regularization} = \lambda_{d1}\|\delta-\hat{\delta}\|_2^2 + \lambda_{d2}\|\gamma-\hat{\gamma}\|_2^2 + \lambda_{d3}\|p-\hat{p}\|_2^2 + \lambda_{d4}\|t-\hat{t}\|_2^2 + \lambda_\delta\|\delta\|_2^2 + \lambda_\gamma\|\gamma\|_2^2;$$

wherein the second comprehensive reconstruction parameter estimated for the second video frame by the teacher network model is $(\hat{\alpha}, \hat{\delta}, \hat{\beta}, \hat{\gamma}, \hat{p}, \hat{t})$, the target dynamic reconstruction parameter estimated for the second video frame by the student network model is $(\delta, \gamma, p, t)$, $\lambda_{d1}$, $\lambda_{d2}$, $\lambda_{d3}$, $\lambda_{d4}$, $\lambda_\delta$, and $\lambda_\gamma$ are respectively weights corresponding to the regulation terms of corresponding reconstruction parameters under the loss function between the second comprehensive reconstruction parameter and the target dynamic reconstruction parameter.

At the same time, in some embodiments, the loss function under the predetermined two-dimensional supervision term includes an image pixel loss function, a keypoint loss function, an identity feature loss function, and an albedo penalty function.

In some embodiments, upon the three-dimensional face corresponding to the second video frame being reconstructed, a reconstruction error between the reconstructed three-dimensional face and the second video frame, that is, a specific value of the loss function, is calculated based on the loss function between the second comprehensive reconstruction parameter and the target dynamic reconstruction parameter and the loss function between the three-dimensional face corresponding to the second video frame and the second video frame under the predetermined two-dimensional supervision term. Then, the fidelity of the reconstructed three-dimensional face under each of the loss functions is analyzed based on the specific value of each of the loss functions, such that the estimation accuracy of the trained student network model under each of the loss functions is determined, and further, a weight corresponding to each of the loss functions is correspondingly adjusted to improve the estimation capability in a next training.

In some embodiments, by respectively calculating the image pixel loss function, the keypoint loss function, the identity feature loss function, and the albedo penalty function between the three-dimensional face and the second video frame, and the regulation term corresponding to the loss function between the second comprehensive reconstruction parameter and the target dynamic reconstruction parameter, accurate-reconstruction capabilities of the image pixel, the keypoint, the identity feature, the albedo, and other reconstruction parameters during the three-dimensional face reconstruction in the current training process are determined. The training is continued by correspondingly adjusting the weight of each of the loss functions based on the specific reconstruction capability, such that the estimation capability of the student network model to estimate the dynamic reconstruction parameter during the three-dimensional face reconstruction is continuously improved.

In some embodiments, the image pixel loss function, the keypoint loss function, the identity feature loss function, and the albedo penalty function included in the loss function under the predetermined two-dimensional supervision term are respectively analyzed as follows.

1) A determination process of the image pixel loss function includes: segmenting a corresponding skin mask from the second video frame; and acquiring the corresponding image pixel loss function by calculating, based on the skin mask, a pixel error between a pixel point in the three-dimensional face corresponding to the second video frame and the same pixel point in a face skin region in the second video frame.

In some embodiments, a mask is a binary image composed of pixel values 0 and 1. In the embodiments, in the case that the image pixel loss function is set, to ensure the accuracy of image pixel loss during a training process, the skin mask is applied to a second video frame, such that the pixel values in a face skin region in the second video frame are all set to 1, and pixel values in a non-face skin region are all set to 0. Therefore, the corresponding face skin region is accurately segmented from the second video frame using a skin segmentation algorithm, such that interference of pixel features in the non-face skin region on the three-dimensional face reconstruction is avoided. Then, upon the corresponding skin mask being segmented from the second video frame, pixel points at the same pixel position in the reconstructed three-dimensional face and in the second video frame are found. It can be accurately determined whether each of the pixel points at the same pixel positions is in the face skin region based on the segmented skin mask. A whole pixel error of the three-dimensional face and the second video frame in the face skin region is analyzed by calculating the pixel error, between the three-dimensional face and the second video frame, of each of the pixel points in the face skin region, such that the image pixel loss function is acquired. The image pixel loss function only compares pixel errors in the face skin region before and after the reconstruction, but shields an influence of the pixel in the non-face skin region, such that the face identity feature and albedo information in the estimated reconstruction parameters are more accurate.

In some embodiments, the image pixel loss function is:

$$L_{photometric} = \frac{1}{n}\sum_{i=1}^{n}\frac{1}{WH}\sum_{j=1}^{H}\sum_{k=1}^{W}M_{jk}\left\|I_{in}^{i,jk} - I_{out}^{i,jk}\right\|_{2};$$

wherein $I_{in}^{i,jk}$ represents a pixel value of a pixel point (j, k) in a second video frame in an i-th video frame training pair, $I_{out}^{i,jk}$ represents a pixel value of a pixel point (j, k) in a three-dimensional face reconstructed from the second video frame in the i-th video frame training pair, and $M_{jk}$ represents a pixel value of a pixel point (j, k) in a skin mask. At this time, $M_{jk}$ of a pixel point in a face skin area in a skin mask is 1, and $M_{jk}$ of a pixel point in a non-face skin area in a skin mask is 0.

2) A determination process of the keypoint loss function includes: extracting key feature points at predetermined positions from the second video frame, and determining visibility of each of the key feature points; and acquiring the corresponding keypoint loss function by calculating a position reconstruction error, between the three-dimensional face corresponding to the second video frame and the second video frame, of each of the visible key feature points.

Figure 3C:
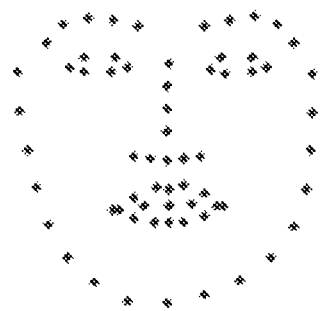
FIG. 3C is a schematic distribution diagram of key feature points in a method according to the embodiments of the present disclosure.

In some embodiments, to ensure one-to-one matching of the key feature points in the reconstructed three-dimensional face and the second video frame, when setting the keypoint loss function for the training process, a Landmark algorithm is adopted to extract, from the training sample, the key feature points at the predetermined positions in each of face regions. In some embodiments, 17 key feature points on a face contour, five key feature points each on left and right eyebrows, six key feature points each on left and right eyes, nine key feature points on a nose, and 20 key feature points on a mouth are extracted. In some embodiments, a total of 68 key feature points are adopted, as shown in FIG. 3C. At this time, due to different head postures in different training samples, key feature points at some predetermined positions may not be visible. Therefore, upon extracting the key feature points at multiply predetermined positions from the second video frame, it is also determined whether each of the key feature points is visible. Moreover, upon determining each of the visible key feature points, by analyzing whether the pixel positions of each of the visible key feature points in the reconstructed three-dimensional face and the second video frame are consistent, the position reconstruction error of each of the visible key feature points before and after reconstruction is calculated, such that the corresponding keypoint loss function is acquired. At this time, for a face with a large head rotation angle in the second video frame, only the visible half key feature points need to be selected to calculate the corresponding keypoint reconstruction loss, and the invisible key feature points do not participate in the loss calculation of keypoint reconstruction.

In some embodiments, the keypoint loss function is:

$$L_{landmark} = \frac{1}{68n}\sum_{i=1}^{n}\sum_{j=1}^{68}w_{j}\left\|(1_{in}^{i,j} - 1_{out}^{i,j})*v_{ij}\right\|_{2};$$

wherein $1_{in}^{i,j}$ in represents a position coordinate of a j-th key feature point in the second video frame in the i-th video frame training pair, $1_{out}^{i,j}$ represents a position coordinate of a j-th key feature point in a three-dimensional face reconstructed from the second video frame in the i-th video frame training pair, $v_{ij}$ represents the visibility of the j-th key feature point, a value of a visible key feature point being 1, and a value of an invisible key feature point being 0, and $w_j$ represents a weight of the j-th key feature point in the loss function, wherein different weights are respectively adopted for different face parts (such as eyes, mouths, contour points), and the weights are controlled by adjusting a value of $w_j$.

3) A determination process of the identity feature loss function includes: acquiring a first identity feature of the second video frame and a second identity feature of the three-dimensional face corresponding to the second video frame by inputting the three-dimensional face corresponding to the second video frame and the second video frame into a pre-constructed face recognition model; and calculating the corresponding identity feature loss function based on a similarity between the first identity feature and the second identity feature.

In some embodiments, determining the identity feature loss function is actually to analyze whether the identity feature changes before and after reconstruction. Therefore, in the present embodiment, for identity feature recognition, a corresponding face recognition model is constructed in advance, and the identity features before and after reconstruction are extracted by the face recognition model. Firstly, the second video frame and the reconstructed three-dimensional face are respectively inputted into the face recognition model, and face features in the second video frame and the three-dimensional face are respectively analyzed by the face recognition model, such that the first identity feature corresponding to the second video frame and the second identity feature corresponding to the three-dimensional face are determined respectively, which facilitates to determine whether an error is present in the identity features before and after reconstruction. Upon acquiring the first identity feature corresponding to the second video frame and the second identity feature corresponding to the three-dimensional face, for analyzing whether an error is present in the identity features before and after reconstruction, it is necessary to determine the similarity between the first identity feature and the second identity feature, and then calculate the corresponding identity feature loss function based on the similarity.

In some embodiments, the identity feature loss function is:

$$L_{perception} = \frac{1}{n}\sum_{i=1}^{n}\left(1 - \frac{\langle F_{in}^i, F_{out}^i \rangle}{\|F_{in}^i\|\|F_{out}^i\|_2}\right);$$

wherein $F_{in}^i$ represents a first identity feature corresponding to the second video frame in the i-th video frame training pair, and $F_{out}^i$ represents a second identity feature corresponding to the three-dimensional face reconstructed based on the second video frame in the i-th video frame training pair.

4) A determination process of the albedo penalty function includes: calculating an albedo of each of the mesh vertices in the three-dimensional face corresponding to the second video frame; and calculating the corresponding albedo penalty function based on the albedo of each of the mesh vertices in the three-dimensional face and a predetermined albedo range.

In some embodiments, by detecting information, such as color and reflection light intensity of each of the pixel points in the second video frame, the albedo of each of the pixel points can be calculated, and then the albedo of each of the vertices on the reconstructed three-dimensional face is set, based on position matching situation between each of vertices in the reconstructed three-dimensional face and each of the pixel points in the second video frame, to ensure consistency of the face albedo before and after reconstruction. At this time, to ensure that the albedo of each of the vertices in the reconstructed three-dimensional face is not too low or too high, the albedo on each of the vertices in the three-dimensional face is correspondingly adjusted. In some embodiments, a reasonable predetermined albedo range is predetermined. In some embodiments, the predetermined albedo range is [0.05, 0.95]. In this way, the albedo of each of the vertices in the reconstructed three-dimensional face is within the predetermined albedo range. Therefore, by analyzing whether the albedo of each of the vertices in the three-dimensional face is within the predetermined albedo range, a corresponding albedo penalty function is calculated, such that the albedo on the reconstructed three-dimensional face can be continuously optimized during the training.

In some embodiments, the albedo penalty function is:

$$L_{box} = \frac{1}{n*3N}\sum_{i=1}^{n}\sum_{j=1}^{3N}\|T^{i,j} - T_{clip}^{i,j}\|_2;$$

wherein $T^{i,j}$ represents an albedo of the j-th pixel point in the second video frame in the i-th video frame training pair, and $T_{clip}^{i,j}$ represents an albedo of the j-th pixel point in the three-dimensional face reconstructed based on the second video frame in the i-th video frame training pair.

Accordingly, in some embodiments, the loss function between the three-dimensional face corresponding to the second video frame and the second video frame under the predetermined two-dimensional supervision term is represented as:

$$L_{fidelity}=\lambda_p L_{photometric}+\lambda_l L_{landmark}+\lambda_{id} L_{perception}+\lambda_b L_{box};$$

wherein $\lambda_p$, $\lambda_l$, $\lambda_{id}$, and $\lambda_b$ are respectively weights corresponding to each of the loss functions under the predetermined two-dimensional supervision item.

In S340, a corresponding fitting loss function is generated based on each of the loss functions and the corresponding weight, and the student network model is trained by performing inverse correction on the student network model using the fitting loss function.

In some embodiments, upon calculating each of the loss functions between the three-dimensional face and the second video frame and adjusting the weight corresponding to each of the loss functions, a corresponding fitting loss function is generated by integrating each of the loss functions based on the weight corresponding to each of the loss functions, and the fitting loss function is determined as a loss function of a whole training process of the student network model. Then, a network parameter in the student network model is corrected by performing back propagation using the fitting loss function based on the whole training process. Subsequently, the student network model corrected by the above process is adopted to continuously estimate the dynamic reconstruction parameter of the second video frame from a next video frame training pair for the three-dimensional face reconstruction, thereby achieving the continuous training process. The trained student network model is acquired by continuously performing inverse correction on the student network model. In this way, the fitting loss function in the embodiments makes reference information in the training process to be more comprehensive, thereby improving the estimation accuracy of the student network model on the dynamic reconstruction parameter.

In some embodiments, the fitting loss function is: $L=L_{fidelity}+L_{regularization}$, wherein $L_{fidelity}$ represents the loss function between the three-dimensional face corresponding to the second video frame and the second video frame under the predetermined two-dimensional supervision term, and $L_{regularization}$ represents a loss function between the second comprehensive reconstruction parameter and the target dynamic reconstruction parameter.

In the embodiments, for the student network model distilled from the teacher network model, the accuracy of the dynamic reconstruction parameter estimated by the student network model for the second video frame is analyzed by taking each of the comprehensive reconstruction parameters, estimated by the teacher network model for the first video frame and the second video frame from each of the video frame training pairs, as the reference, and the three-dimensional face corresponding to the second video frame is reconstructed by inputting the steady-state reconstruction parameter estimated by the teacher network model for the first video frame and the dynamic reconstruction parameter estimated by the student network model for the second video frame into the three-dimensional deformation model. At this time, by analyzing the loss function between the three-dimensional face corresponding to the second video frame and the second video frame under the predetermined two-dimensional supervision term, and the loss function between the dynamic reconstruction parameters estimated by the teacher network model and the student network model for the second video frame, the inverse correction can be continuously performed on the student network model, such that a student network model with a high estimation accuracy can be trained. In this way, the reference information for the student network model during the whole training process is more comprehensive, which improves the estimation accuracy of the student network model for the dynamic reconstruction parameter, thereby achieving personalized reconstruction of the three-dimensional face in each of the video frames on the premise of ensuring the reconstruction stability of the three-dimensional face in the consecutive video frames and improving the accuracy of the three-dimensional face reconstruction.

Embodiment IV

Figure 4:
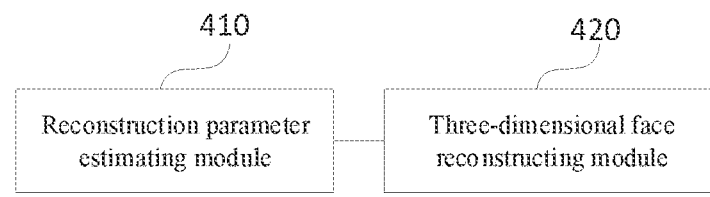
FIG. 4 is a schematic structural diagram of an apparatus for reconstructing three-dimensional faces according to the embodiments of the present disclosure.

FIG. 4 is a schematic structural diagram of an apparatus for reconstructing three-dimensional faces according to the embodiments of the present disclosure, specifically, as shown in FIG. 4, the apparatus includes:
- a reconstruction parameter estimating module 410, configured to estimate a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model; and
- a three-dimensional face reconstructing module 420, configured to reconstruct a three-dimensional face corresponding to the current video frame by inputting the steady-state reconstruction parameter and the dynamic reconstruction parameter into a pre-constructed three-dimensional deformation mode.

In the embodiments, considering that the consecutive video frames in the same video include the same face, the steady-state reconstruction parameter of each of the video frames that hardly changes under the three-dimensional face reconstruction is estimated uniformly in advance by the pre-constructed teacher network model, and subsequently, to reconstruct the three-dimensional face for each of the current video frames, the dynamic reconstruction parameter of the current video frame for the three-dimensional face reconstruction is directly estimated by the student network model distilled from the teacher network model. Because the student network model is acquired by performing knowledge distillation on the teacher network model, and the steady-state reconstruction parameter of each of the video frames for the three-dimensional face reconstruction does not need to be respectively calculated, the computational overhead of the three-dimensional face reconstruction is greatly reduced, the efficiency of the three-dimensional face reconstruction is improved, and the accuracy of the dynamic reconstruction parameter of the current video frame for the three-dimensional face reconstruction is ensured. Then, the steady-state reconstruction parameter and the dynamic reconstruction parameter of the current video frame for the three-dimensional face reconstruction are directly inputted into the pre-constructed three-dimensional deformation model to reconstruct the three-dimensional face corresponding to the current video frame. Because the steady-state reconstruction parameters of the consecutive video frames for the three-dimensional face reconstruction are unchanged, a shaking problem of the consecutive video frames under the three-dimensional face reconstruction is avoided. At the same time, on the premise of ensuring the stability of the three-dimensional face reconstruction of the consecutive video frames, the dynamic reconstruction parameter of each of the video frames for the three-dimensional face reconstruction is used to achieve the individualized reconstruction of the three-dimensional face of each of the video frames, such that the accuracy of the three-dimensional face reconstruction is improved.

The apparatus for reconstructing three-dimensional faces according to the embodiments is applicable to performing the method for reconstructing three-dimensional faces according to any one of the above embodiments, which has corresponding functions and effects.

Embodiment V

Figure 5:
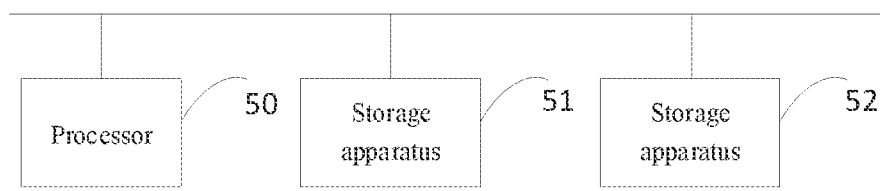
FIG. 5 is a schematic structural diagram of a computer device according to the embodiments of the present disclosure.

FIG. 5 is a schematic structural diagram of a computer device according to the embodiments of the present disclosure. As shown in FIG. 5, the device includes a processor 50, a storage apparatus 51, and a communication apparatus 52. The number of processors 50 in the device is one or more, and illustratively, one processor 50 is shown in FIG. 5. The processor 50, the storage apparatus 51, and the communication apparatus 52 in the device are connected via a bus or by other means, and illustratively, they are connected via a bus in FIG. 5.

The computer device according to the embodiments is for executing the method for reconstructing three-dimensional faces according to any one of the above embodiments, which has corresponding functions and beneficial effects.

Embodiment VI

The embodiments of the present disclosure further provide a computer-readable storage medium storing a computer program thereon. The program, when loaded and run by a processor, causes the processor to perform the method for reconstructing three-dimensional faces according to any one of the above embodiments. The method includes:
- estimating a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model; and
- reconstructing a three-dimensional face corresponding to the current video frame by inputting the steady-state reconstruction parameter and the dynamic reconstruction parameter into a pre-constructed three-dimensional deformation model.

The embodiments of the present disclosure provide a storage medium storing computer-executable instructions, wherein the computer-executable instructions are not limited to achieving the above method operations, but also can be loaded and run by a processor to cause the processor to perform the related operations in the method for reconstructing three-dimensional faces according to any embodiment of the present disclosure.

In some embodiments, the storage medium is a non-transitory storage medium.

From the above description of the embodiments, it is obvious to those skilled in the art that the present disclosure is achieved by software and necessary common hardware. Certainly, the present disclosure can be achieved by hardware, but the former is a better embodiment in many cases. Based on such understanding, the technical solutions of the present disclosure, or the parts of the present disclosure that contribute to the relevant technologies can be substantially embodied in the form of a software product, wherein the computer software product is stored in a computer-readable storage medium, such as a floppy disk, a read-only memory (ROM), a random access memory (RAM), a flash memory (FLASH), a hard disk, or an optical disk of a computer, and includes several instructions for enabling a computer device (which is a personal computer, a server, or a network device) to execute the method according to the embodiments of the present disclosure.

It should be noted that in the above embodiments of the apparatus for reconstructing three-dimensional faces, each of the units and modules included in the apparatus is only divided according to functional logic, but is not limited to the above division, as long as corresponding functions are achieved. In addition, the names of each of the functional units are merely for convenience of distinguishing from each other and are not intended to limit the protection scope of the present disclosure.

The embodiments of the present disclosure provide a method and an apparatus for reconstructing three-dimensional faces, a device, and a storage medium, which reduce the computational overhead of the three-dimensional face reconstruction and improve the efficiency of the three-dimensional face reconstruction on the premise of ensuring the accuracy of the reconstruction of the three-dimensional face.

The above description is only a few embodiments of the present disclosure and is not intended to limit the present disclosure, and various modifications and changes may be made to the present disclosure by those skilled in the art. Any modifications, equivalent replacements, improvements, and the like made within the concept of the present disclosure are included in the protection scope of the present disclosure.

What is claimed is:

1. A method for reconstructing three-dimensional faces, comprising:
    estimating a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model; and
    reconstructing a three-dimensional face corresponding to the current video frame by inputting the steady-state reconstruction parameter and the dynamic reconstruction parameter into a pre-constructed three-dimensional deformation model.

2. The method according to claim 1, wherein prior to estimating the dynamic reconstruction parameter of the current video frame for the three-dimensional face reconstruction by inputting the current video frame into the student network model distilled from the teacher network model, the method further comprises:
    estimating a comprehensive reconstruction parameter of an associated video frame with a same face as the current video frame for the three-dimensional face reconstruction by inputting the associated video frame into the teacher network model, and determining a steady-state reconstruction parameter in the comprehensive reconstruction parameter as the steady-state reconstruction parameter of the current video frame for the three-dimensional face reconstruction.

3. The method according to claim 2, wherein the associated video frame is a first video frame with a face within the current video frame in a video to which the current video frame belongs, or the associated video frames are first m video frames with the face within the current video frame in the video to which the current video frame belongs, wherein m represents a target number.

4. The method according to claim 2, wherein
    the associated video frames are first m video frames with a face within the current video frame in a video to which the current video frame belongs, wherein m represents a target number; and
    determining the steady-state reconstruction parameter in the comprehensive reconstruction parameter as the steady-state reconstruction parameter of the current video frame for the three-dimensional face reconstruction comprises:
        acquiring the steady-state reconstruction parameter of the current video frame by fusing the steady-state reconstruction parameters of a same type from the comprehensive reconstruction parameters of the associated video frames.

5. The method according to claim 1, wherein the student network model is acquired by distilling the teacher network model by following processes:
    estimating a first comprehensive reconstruction parameter of a first video frame for the three-dimensional face reconstruction and a second comprehensive reconstruction parameter of a second video frame for the three-dimensional face reconstruction by inputting the first video frame and the second video frame into the teacher network model, the first video frame and the second video frame being from a video frame training pair with a same face in a video training set;
    estimating a target dynamic reconstruction parameter of the second video frame for the three-dimensional face reconstruction by inputting the second video frame from the video frame training pair into the student network model, and reconstructing a three-dimensional face corresponding to the second video frame by inputting a target steady-state reconstruction parameter in the first comprehensive reconstruction parameter and the target dynamic reconstruction parameter into the three-dimensional deformation model;
    calculating a first loss function between the second comprehensive reconstruction parameter and the target dynamic reconstruction parameter and a second loss function between the three-dimensional face corresponding to the second video frame and the second video frame under a predetermined two-dimensional supervision term, and adjusting a weight corresponding to each of loss functions in the first loss function and the second loss function; and generating a corresponding fitting loss function based on each of the loss functions and the corresponding weight, and training the student network model by performing inverse correction on the student network model using the fitting loss function.

6. The method according to claim 5, wherein the second loss function under the predetermined two-dimensional supervision term comprises: an image pixel loss function, a keypoint loss function, an identity feature loss function, and an albedo penalty function.

7. The method according to claim 6, wherein in a case that the image pixel loss function between the three-dimensional face corresponding to the second video frame and the second video frame is to be calculated, the method further comprises:

segmenting a corresponding skin mask from the second video frame; and calculating the image pixel loss function between the three-dimensional face corresponding to the second video frame and the second video frame comprises:

acquiring the corresponding image pixel loss function by calculating, based on the skin mask, a pixel error between a pixel point in the three-dimensional face corresponding to the second video frame and the same pixel point in a face skin region in the second video frame.

8. The method according to claim 6, wherein in a case that the keypoint loss function between the three-dimensional face corresponding to the second video frame and the second video frame is to be calculated, the method further comprises:

extracting key feature points at predetermined positions from the second video frame, and determining visibility of each of the key feature points; and calculating the keypoint loss function between the three-dimensional face corresponding to the second video frame and the second video frame comprises:

acquiring the corresponding keypoint loss function by calculating a position reconstruction error, between the three-dimensional face corresponding to the second video frame and the second video frame, of each of visible key feature points.

9. The method according to claim 6, wherein in a case that the identity feature loss function between the three-dimensional face corresponding to the second video frame and the second video frame is to be calculated, the method further comprises:

acquiring a first identity feature of the second video frame and a second identity feature of the three-dimensional face corresponding to the second video frame by inputting the three-dimensional face corresponding to the second video frame and the second video frame into a pre-constructed face recognition model; and calculating the identity feature loss function between the three-dimensional face corresponding to the second video frame and the second video frame comprises:

calculating the corresponding identity feature loss function based on a similarity between the first identity feature and the second identity feature.

10. The method according to claim 6, wherein in a case that the albedo penalty function of the three-dimensional face corresponding to the second video frame is to be calculated, the method further comprises:

calculating an albedo of each of mesh vertices in the three-dimensional face corresponding to the second video frame; and calculating the albedo penalty function of the three-dimensional face corresponding to the second video frame comprises:

calculating the corresponding albedo penalty function based on the albedo of each of the mesh vertices in the three-dimensional face and a predetermined albedo range.

11. The method according to claim 1, wherein the three-dimensional deformation model is composed of a bilinear face model and a principal component analysis (PCA) model, wherein a core tensor of the three-dimensional face is defined in the bilinear face model, the core tensor being composed of three dimensions of a mesh vertex, a face shape, and a face expression of the three-dimensional face; and the PCA model defines an average face albedo and a principal component base representing a change of a face albedo; and reconstructing the three-dimensional face corresponding to the current video frame by inputting the steady-state reconstruction parameter and the dynamic reconstruction parameter into the pre-constructed three-dimensional deformation model comprises:

acquiring a corresponding three-dimensional deformation face by adjusting the core tensor by inputting a reconstruction parameter representing a change of the face shape in the steady-state reconstruction parameters and a reconstruction parameter representing a change of the face expression in the dynamic reconstruction parameters into the bilinear face model; and acquiring a reconstructed three-dimensional face by correcting an albedo of the three-dimensional deformation face based on the average face albedo by inputting the three-dimensional deformation face and a reconstruction parameter matched with the principal component base under the PCA model in the steady-state reconstruction parameters and the dynamic reconstruction parameters into the PCA model.

12. The method according to claim 11, wherein prior to reconstructing the three-dimensional face corresponding to the current video frame by inputting the steady-state reconstruction parameter and the dynamic reconstruction parameter into the pre-constructed three-dimensional deformation model, the method further comprises:

collecting three-dimensional face scanning data from a multi-dimensional data source, and acquiring a corresponding core tensor by performing high-order singular value decomposition, under a face shape dimension and a face expression dimension, on a three-dimensional face reconstructed based on the three-dimensional face scanning data.

13. The method according to claim 11, wherein the three-dimensional deformation model further defines an illumination parameter representing a change of face illumination, a position parameter representing a face translation, and a rotation parameter representing a head posture.

14. The method according to claim 1, wherein upon reconstructing the three-dimensional face corresponding to the current video frame by inputting the steady-state reconstruction parameter and the dynamic reconstruction parameter into the pre-constructed three-dimensional deformation model, the method further comprises:

rendering the three-dimensional face corresponding to the current video frame using a differentiable renderer.

15. The method according to claim 1, further comprising:
estimating a comprehensive reconstruction parameter of the current video frame for the three-dimensional face reconstruction by inputting, in response to the steady-state reconstruction parameter of the current video frame for the three-dimensional face reconstruction not being estimated by the pre-constructed teacher network model, the current video frame into the teacher network model, and reconstructing the three-dimensional face corresponding to the current video frame by inputting the comprehensive reconstruction parameter of the current video frame for the three-dimensional face reconstruction into the three-dimensional deformation model.

16. A computer device for reconstructing three-dimensional faces, comprising:
one or more processors; and
a storage apparatus, configured to store one or more programs; wherein
the one or more processors, when loading and running the one or more programs, are caused to perform:
estimating a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model; and
reconstructing a three-dimensional face corresponding to the current video frame by inputting the steady-state reconstruction parameter and the dynamic reconstruction parameter into a pre-constructed three-dimensional deformation model.

17. The computer device according to claim 16, wherein the one or more processors, when loading and running the one or more programs, are caused to perform:
prior to estimating the dynamic reconstruction parameter of the current video frame for the three-dimensional face reconstruction by inputting the current video frame into the student network model distilled from the teacher network model, estimating a comprehensive reconstruction parameter of an associated video frame with a same face as the current video frame for the three-dimensional face reconstruction by inputting the associated video frame into the teacher network model, and determining a steady-state reconstruction parameter in the comprehensive reconstruction parameter as the steady-state reconstruction parameter of the current video frame for the three-dimensional face reconstruction.

18. The computer device according to claim 17, wherein the associated video frame is a first video frame with a face within the current video frame in a video to which the current video frame belongs, or the associated video frames are first m video frames with the face within the current video frame in the video to which the current video frame belongs, wherein m represents a target number.

19. The computer device according to claim 17, wherein
the associated video frames are first m video frames with a face within the current video frame in a video to which the current video frame belongs, wherein m represents a target number; and
the one or more processors, when loading and running the one or more programs, are caused to perform:
acquiring the steady-state reconstruction parameter of the current video frame by fusing the steady-state reconstruction parameters of a same type from the comprehensive reconstruction parameters of the associated video frames.

20. A non-transitory computer-readable storage medium, storing a computer program, wherein the computer program, when loaded and run by a processor, causes the processor to perform:
estimating a dynamic reconstruction parameter of a current video frame for three-dimensional face reconstruction by inputting, in response to a steady-state reconstruction parameter of the current video frame for the three-dimensional face reconstruction having been estimated by a pre-constructed teacher network model, the current video frame into a student network model distilled from the teacher network model; and
reconstructing a three-dimensional face corresponding to the current video frame by inputting the steady-state reconstruction parameter and the dynamic reconstruction parameter into a pre-constructed three-dimensional deformation model.

* * * * *